(12) United States Patent
Kim

(10) Patent No.: US 10,563,703 B2
(45) Date of Patent: Feb. 18, 2020

(54) DUAL CLUTCH ACTUATOR

(71) Applicant: HYUNDAI DYMOS INCORPORATED, Chungcheongnam-do (KR)

(72) Inventor: Dae Kyun Kim, Gyeonggi-do (KR)

(73) Assignee: HYUNDAI DYMOS INCORPORATED (KR)

(*) Notice: Subject to any disclaimer, the term of this patent is extended or adjusted under 35 U.S.C. 154(b) by 259 days.

(21) Appl. No.: 15/788,398

(22) Filed: Oct. 19, 2017

(65) Prior Publication Data
US 2018/0112722 A1  Apr. 26, 2018

(30) Foreign Application Priority Data
Oct. 21, 2016  (KR) .................... 10-2016-0137399

(51) Int. Cl.
| | |
|---|---|
| *F16D 23/12* | (2006.01) |
| *F16H 19/02* | (2006.01) |
| *F16H 21/44* | (2006.01) |
| *F16D 28/00* | (2006.01) |
| *F16D 21/06* | (2006.01) |

(52) U.S. Cl.
CPC ............ *F16D 23/12* (2013.01); *F16D 28/00* (2013.01); *F16H 19/02* (2013.01); *F16H 21/44* (2013.01); *F16D 21/06* (2013.01); *F16D 2021/063* (2013.01)

(58) Field of Classification Search
CPC .... F16D 21/06; F16D 2021/063; F16D 28/00; F16D 23/12; F16D 2023/126; F16H 19/02; F16H 21/44
See application file for complete search history.

(56) References Cited

U.S. PATENT DOCUMENTS

| | | | |
|---|---|---|---|
| 5,678,673 A | 10/1997 | Borschert et al. | |
| 7,080,722 B2 * | 7/2006 | Vogt | F16D 13/757 192/111.18 |
| 8,051,965 B2 * | 11/2011 | Kim | F16D 28/00 192/20 |

FOREIGN PATENT DOCUMENTS

| | | |
|---|---|---|
| CN | 101532543 A1 | 9/2009 |
| KR | 10 0192605 B1 | 6/1999 |
| KR | 2011 0029644 A | 3/2011 |

OTHER PUBLICATIONS

Chinese Office Action corresponding to Chinese Application No. 2017109792368 dated Mar. 11, 2019.

* cited by examiner

*Primary Examiner* — Richard M Lorence
(74) *Attorney, Agent, or Firm* — Tarolli, Sundheim, Covell & Tummino LLP

(57) ABSTRACT

Disclosed herein is a dual clutch actuator including: a housing; a stroke controller disposed in the housing, and configured to actuate a clutch by linearly moving a pushrod; a power generation unit configured to generate driving power to operate the stroke controller; and a stroke return unit disposed between the housing and the stroke controller so as to elastically support the stroke controller, and configured to return the linearly moved pushrod to the original position, when the operation of the clutch is released. According to this structure, the dual clutch actuator can return the pushrod to the original position without an operation of a separate actuator, when removing a clutch connection.

5 Claims, 5 Drawing Sheets

[FIG. 1]
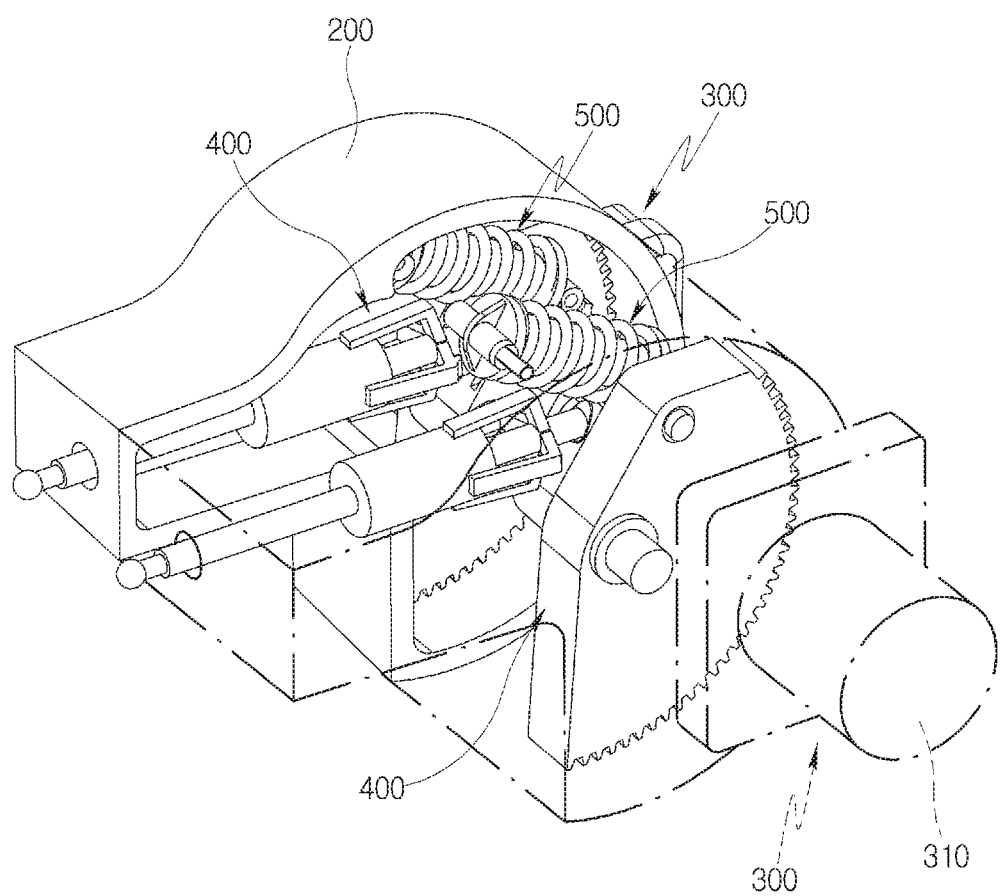

[FIG. 2]
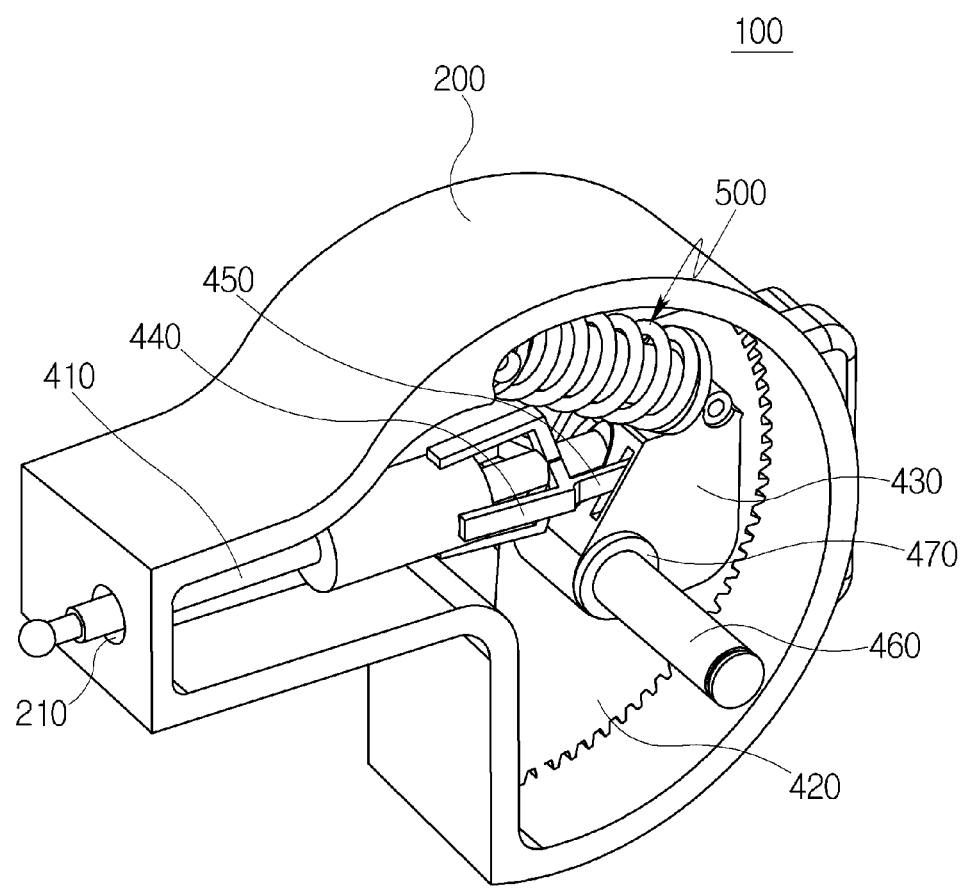

[FIG. 3]
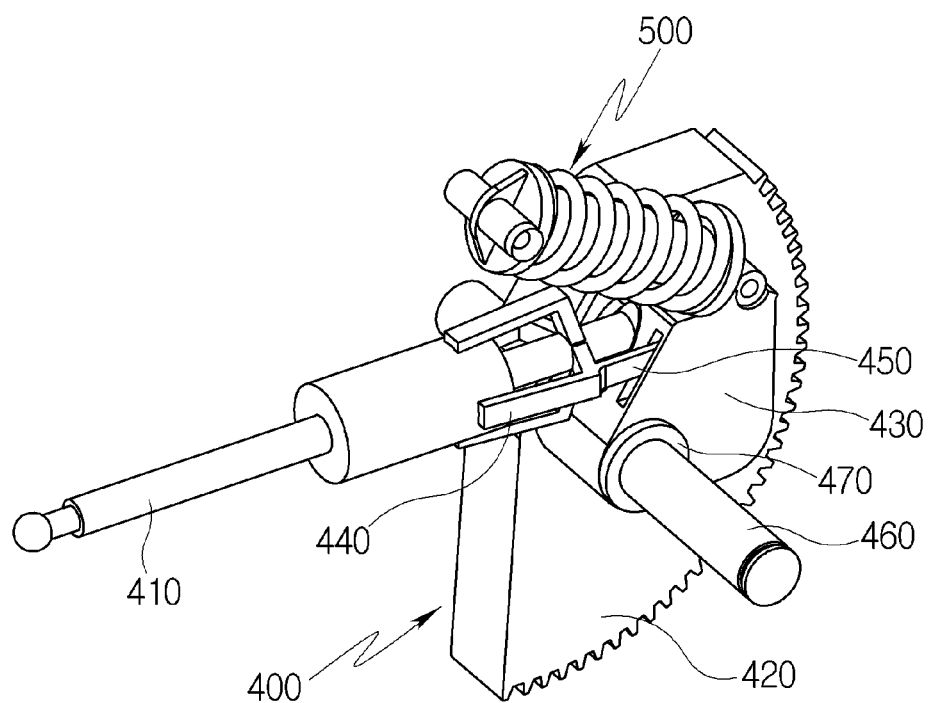

[FIG. 4]
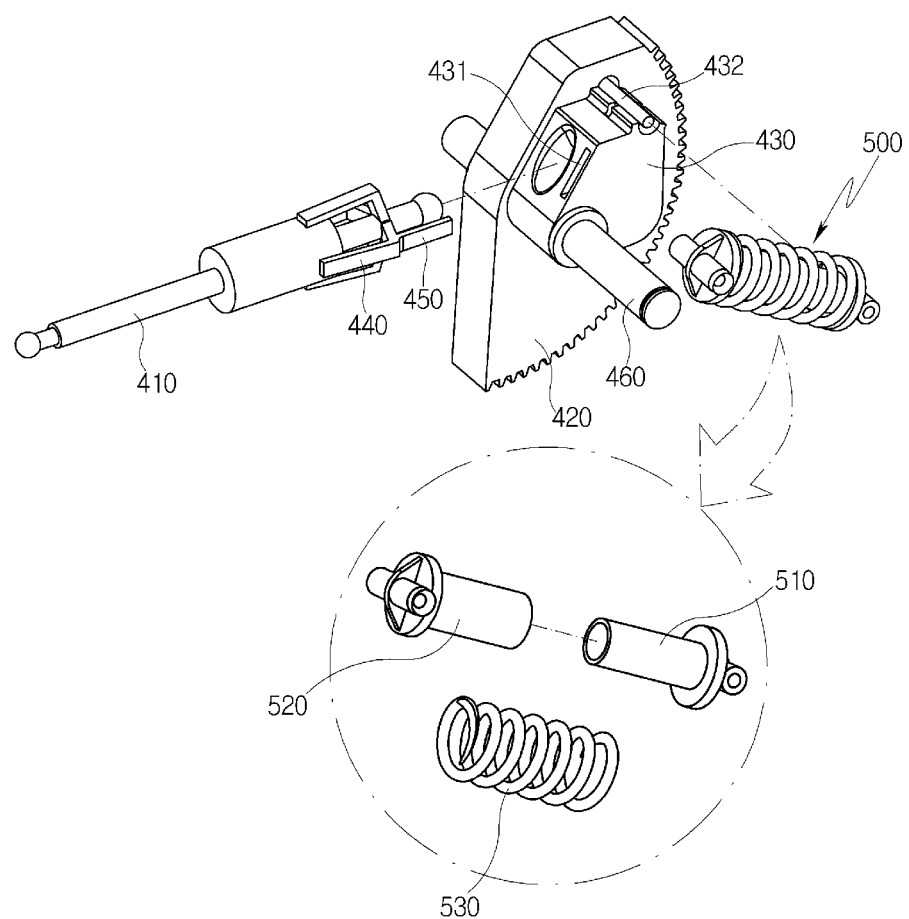

[FIG. 5]
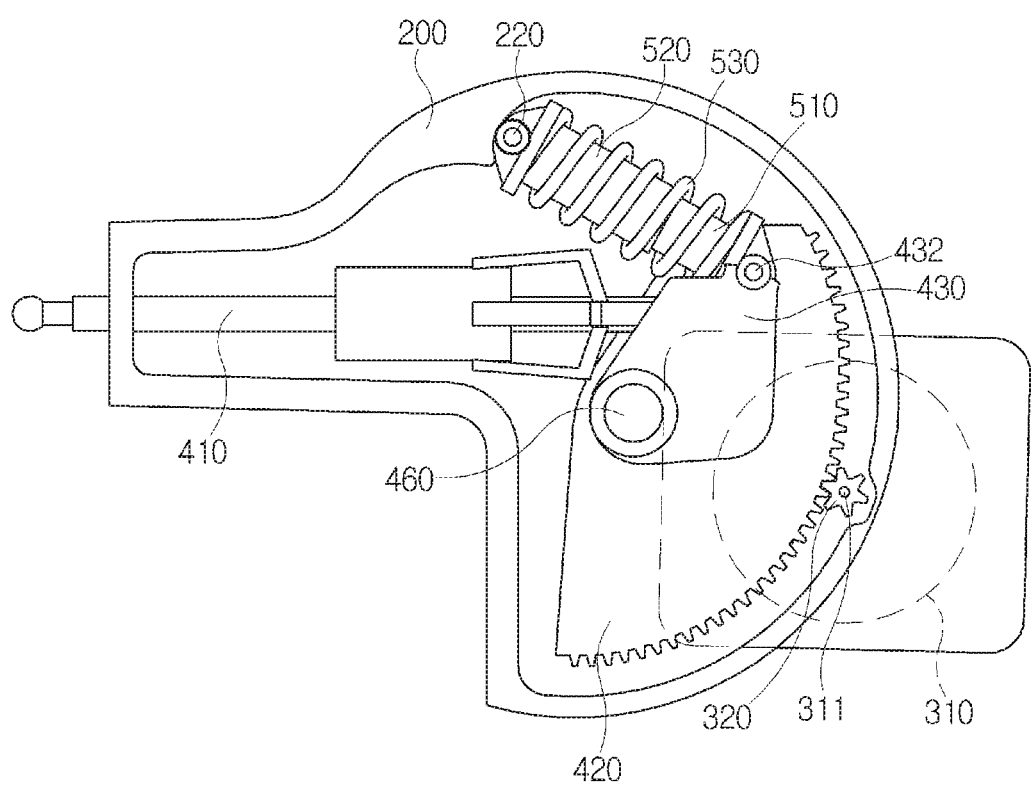

DUAL CLUTCH ACTUATOR

CROSS-REFERENCE TO RELATED APPLICATIONS

This application claims priority to Korean Patent Application No. 10-2016-0137399, filed on Oct. 21, 2016, the disclosure of which is incorporated herein by reference in its entirety.

BACKGROUND OF THE INVENTION

Field of the Invention

Exemplary embodiments of the present disclosure relate to a dual clutch actuator, and more particularly, to a dual clutch actuator which controls a clutch by linearly moving a pushrod through an operation of a motor.

Description of the Related Art

In general, a double clutch transmission (DCT) allows automatic gear shifting through operations of a gear actuator and a clutch actuator. Thus, the DCT has high efficiency while performing gear shifting at high speed. The DCT includes a select and shift actuator for gear shifting, which is divided into an electric select and shift actuator and a hydraulic select and shift actuator. The select and shift actuator has a usual combination of a motor and solenoid.

Conventionally, a hydraulic clutch actuator has been used for an automated manual transmission (AMT), in order to secure a large driving power for controlling a clutch. However, the hydraulic clutch actuator requires a high material cost and maintenance cost.

Then, motor-mechanical transmissions including a structure using a worm and worm gear have been developed. Such a structure needs to drive an actuator when releasing a double (dual) clutch. However, when the actuator cannot be driven due to a fault, an unexpected malfunction of the clutch may occur because the clutch cannot be automatically or manually released.

Therefore, there is a demand for development of a dual clutch actuator which can remove a connection of a clutch without an operation of an actuator, thereby preventing a malfunction.

RELATED ART DOCUMENT

Patent Document (Patent Document 1) Korean Patent Publication No. 10-1603795 published on Mar. 9, 2016

SUMMARY OF THE INVENTION

The present disclosure has been made in view of the above problems, and it is an object of the present disclosure to provide a dual clutch actuator capable of removing a connection of a clutch without an operation of an actuator.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a dual clutch actuator may include: a housing; a stroke controller disposed in the housing, and configured to actuate a clutch by linearly moving a pushrod; a power generation unit configured to generate driving power to operate the stroke controller; and a stroke return unit disposed between the housing and the stroke controller so as to elastically support the stroke controller, and configured to return the linearly moved pushrod to the original position, when the operation of the clutch is released.

The power generation unit may include: a motor disposed in the housing, and configured to generate rotational power; and a driving gear fastened to a rotating shaft of the motor to receive driving power, and engaged with the stroke controller to transmit driving power.

The stroke controller may include: a pushrod inserted into a through-hole formed in the housing and linearly moved; a driven gear rotatably fastened to the housing, and engaged with the driving gear; and a pushrod coupling part inserted on the driven gear, rotatably fastened to the pushrod, and linearly moving the pushrod in response to rotation of the driven gear.

The stroke controller may include: a pushrod holder disposed along the circumference of the pushrod; and a holder support extended from the pushrod holder, inserted into a guide hole of the pushrod coupling part, and preventing swaying of the pushrod when the pushrod is linearly moved.

The stroke return unit may include: a first guide rotatably coupled to the stroke controller; a second guide slidably coupled to the first guide, and hinge-coupled to the housing; and a return spring having one end coupled to the first guide and the other end coupled to the second guide, and elastically supporting the first and second guides.

The pair of power generation units, the pair of stroke controllers and the pair of stroke return units may be installed and arranged in parallel in the housing.

The dual clutch actuator may further include a thrust bearing disposed between the pair of stroke controllers so as to prevent friction between the stroke controllers.

According to the embodiment of the present disclosure, the dual clutch actuator can return the pushrod to the original position without an operation of the actuator, when removing a clutch connection.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic perspective view of a dual clutch actuator according to an embodiment of the present disclosure;

FIG. 2 is a schematic perspective view of one of a pair of actuators in the dual clutch actuator according to the embodiment of the present disclosure;

FIG. 3 is a schematic perspective view of a stroke controller and a stroke return unit in the dual clutch actuator according to the embodiment of the present disclosure;

FIG. 4 is a schematic exploded perspective view of the stroke controller and the stroke return unit in the dual clutch actuator according to the embodiment of the present disclosure; and FIG. 5 is a schematic plan view of the dual clutch actuator according to the embodiment of the present disclosure.

DESCRIPTION OF SPECIFIC EMBODIMENTS

Hereafter, exemplary embodiments of the present disclosure will be described in detail with reference to the accompanying drawings.

FIG. 1 is a schematic perspective view of a dual clutch actuator according to an embodiment of the present disclosure, FIG. 2 is a schematic perspective view of one of a pair of actuators in the dual clutch actuator according to the embodiment of the present disclosure, FIG. 3 is a schematic perspective view of a stroke controller and a stroke return unit in the dual clutch actuator, FIG. 4 is a schematic exploded perspective view of the stroke controller and the stroke return unit in the dual clutch actuator, and FIG. 5 is a schematic plan view of the dual clutch actuator.

Referring to FIGS. 1 to 5, the dual clutch actuator 100 according to the embodiment of the present disclosure includes a housing 200, a stroke controller 400, a power generation unit 300 and a stroke return unit 500. The stroke controller 400 is disposed in the housing 200 and actuates a clutch by linearly moving a pushrod 410, the power generation unit 300 generates driving power to operate the stroke controller 400, and the stroke return unit 500 is disposed between the housing 200 and the stroke controller 400 so as to elastically support the stroke controller 400, and returns the linearly moved pushrod 410 to the original position when the clutch is released.

As illustrated in FIG. 1, the dual clutch actuator 100 according to the embodiment of the present disclosure may include the pair of stroke controllers 400, the pair of power generation units 300 and the pair of stroke return units 500, which are arranged in parallel in the housing 200. In other words, the dual clutch actuator includes a pair of actuators having the same configuration, and each of the actuators is separately operated in response to an operation of the power generation unit disposed in the actuator.

The power generation unit 300 includes a motor 310 and a driving gear 320. The motor 310 is disposed in the housing 200 and generates rotational power, and the driving gear 320 is fastened to a rotating shaft 311 of the motor 310 so as to receive driving power, and engaged with a driven gear 420 of the stroke controller 400 so as to transmit driving power. That is, the driving gear 320 which is rotated by the driving power received from the motor 310 is engaged with the driven gear 420, and transmits the driving power to rotate the driven gear 420.

The stroke controller 400 includes the pushrod 410, the driven gear 420, and a pushrod coupling part 430. The pushrod 410 is inserted into a through-hole 210 formed in the housing 200, and linearly moved. The driven gear 420 is rotatably fastened to the housing 200, and engaged with the driving gear 320. The pushrod coupling part 430 is installed on the driven gear 420, has the pushrod 410 rotatably fastened thereto, and linearly moves the pushrod 410 in response to rotation of the driven gear 420.

The pushrod coupling part 430 is fixedly coupled to one side surface of the driven gear 420, and rotated with the driven gear 420 when the driven gear 420 is rotated about a rotating shaft 460.

The driven gear 420 is engaged with the driving gear 320, and rotated about the rotating shaft 460 when the driving gear 320 is rotated by the operation of the motor 310. The rotating shaft 460 is not rotated while being supported by the housing 200, but the driven gear 420 is rotated on the rotating shaft 460.

The stroke controller 400 further includes a pushrod holder 440 and a holder support 450. The pushrod holder 440 is disposed along the circumference of the pushrod 410, and the holder support 450 is extended from the pushrod holder 440, inserted into a guide hole 431 of the pushrod coupling part 430, and prevents swaying of the pushrod 410 when the pushrod 410 is linearly moved.

More specifically, the plurality of pushrod holders 440 are radially arranged along the outer circumferential surface of the pushrod 410 and coupled to the pushrod 410, and the holder support 450 is extended from the pushrod 410 such that an end thereof is inserted into the guide hole 431 formed in the pushrod coupling part 430. The guide hole 431 is opened in the direction that the pushrod 410 is linearly moved.

The stroke return unit 500 is disposed between the housing 200 and the stroke controller 400, and elastically supports the stroke controller 400. The stroke return unit 500 is compressed by the stroke controller 400 when the clutch is operated, and then returned by an elastic force when the operation of the clutch is released, thereby returning the linearly moved pushrod 410 to the original position.

More specifically, the stroke return unit 500 includes a first guide 510, a second guide 520 and a return spring 530. The first guide 510 is rotatably coupled to the pushrod coupling part 430 of the stroke controller 400, the second guide 520 is slidably coupled to the first guide 510 and hinge-coupled to the housing 200, and the return spring 530 has one end coupled to the first guide 510 and the other end coupled to the second guide 520, and elastically supports the first and second guides 510 and 520.

The first guide 510 is rotatably coupled to the spring coupling part 432 installed in the pushrod coupling part 430, and the second guide 520 is rotatably coupled to a hinge 220 formed in the housing 200.

According to this structure, when the motor 310 is driven to rotate the driven gear 420 and the pushrod coupling part 430 is rotated by the rotation of the driven gear 420, the first guide 510 is pressed toward the second guide 520. At this time, the first guide 510 is inserted into the second guide 520 and compresses the return spring 530. Then, when the operation of the motor 310 is released, the pushrod coupling part 430 is returned to the original position by the elastic restoring force of the return spring 530.

Hereafter, the operation and effect of the dual clutch actuator according to the embodiment of the present disclosure will be described with reference to FIG. 5.

When the motor 310 is operated to generate driving power while rotating the driving gear 320 in the clockwise direction, the driven gear 420 engaged with the driving gear 320 is rotated in the counterclockwise direction. When the driven gear 420 is rotated in the counterclockwise direction, the pushrod coupling part 430 disposed at one side of the driven gear 420 is rotated together and moved to the left side. At this time, the pushrod 410 presses and moves a clutch release fork (not illustrated) while protruding from the housing 200. That is, one clutch is connected by the linear movement of the pushrod 410. Simultaneously, the first guide 510 coupled to the spring coupling part 432 is also moved, and compresses the return spring 530 while being inserted into the second guide 520 which is rotatably coupled with one side fixed to the housing 200.

When the gear is shifted from an even-numbered speed to an odd-numbered speed or from an odd-numbered speed to an even-numbered speed or the operation of the vehicle is stopped, the operation of the motor 310 is stopped. In this case, the driving power which has been applied to the driven gear 420 disappears, and the first guide 510 is pushed to the original position by the restoring force of the return spring 530 which has been compressed by the first and second guides 510 and 520. Therefore, the first guide 510 pushes the driven gear 420 to the position before the driving power is applied, and the pushrod coupling part 430 is returned to the position before the motor 310 is operated, thereby stopping the linear movement of the pushrod 410.

That is, when the motor 310 is operated, the driven gear 420 is rotated to linearly move the pushrod 410, and when the operation of the motor 310 is stopped, the pushrod 410 is returned to the original position by the restoring force of the return spring 530. In the related art, a power source is required to reversely rotate a driven gear when a stroke is released. In the present embodiment, however, the pushrod 410 can be returned to the original position only by the restoring force of the return spring 530.

In the present embodiment, the holder support 450 is installed to support the pushrod holder 440. This is in order to prevent an interference between the pair of pushrods 410 by swaying which may occur when the pushrods 410 are linearly moved.

The pushrod coupling part 430 has the guide hole 431 for guiding the holder support 450. Therefore, when the pushrod 410 sways toward the holder support 450, the pushrod 410 can be guided in the direction that the guide hole 431 is formed, which makes it possible to prevent an interference between the pushrods 410.

In the present embodiment, the dual clutch actuator further includes a thrust bearing 470 which is inserted into the rotating shaft 460 and disposed between the pair of pushrod coupling parts 430. The thrust bearing 470 prevents friction between the pair of pushrod coupling parts 430.

Furthermore, since the return spring 530 elastically supports the first and second guides 510 and 520 while one end thereof is in contact with the first guide and the other end thereof is in contact with the second guide 520, the return spring 530 can attenuate vibration generated during operation. Thus, the stroke driving power of the pushrod 410 can be constantly maintained.

According to this structure, the dual clutch actuator 100 according to the embodiment of the present disclosure can release a stroke of the pushrod 410 using the elastic force of the return spring 530 without a separate driving force, prevent an interference between the pushrods 410 through the holder support 450 and the guide hole 431, and minimize friction between the pushrod coupling parts 430 through the thrust bearing 470.

While the present disclosure has been described with respect to the specific embodiments, it will be apparent to those skilled in the art that various changes and modifications may be made without departing from the spirit and scope of the disclosure as defined in the following claims.

What is claimed is:

1. A dual clutch actuator comprising:
   a housing;
   a stroke controller disposed in the housing, and configured to actuate a clutch by linearly moving a pushrod;
   a power generation unit configured to generate driving power to operate the stroke controller; and
   a stroke return unit disposed between the housing and the stroke controller so as to elastically support the stroke controller, and configured to return the linearly moved pushrod to the original position, when the operation of the clutch is released;
   wherein the stroke controller comprises:
   the pushrod inserted into a through-hole formed in the housing and linearly moved;
   a driven gear rotatably fastened to the housing, and engaged with the power generation unit;
   a pushrod coupling part inserted on the driven gear, rotatably fastened to the pushrod, and linearly moving the pushrod in response to rotation of the driven gear;
   a pushrod holder disposed along the circumference of the pushrod; and
   a holder support extended from the pushrod holder, inserted into a guide hole of the pushrod coupling part, and preventing swaying of the pushrod when the pushrod is linearly moved.

2. The dual clutch actuator of claim 1, wherein the power generation unit comprises:
   a motor disposed in the housing, and configured to generate rotational power; and
   a driving gear fastened to a rotating shaft of the motor to receive driving power, and engaged with the stroke controller to transmit driving power.

3. The dual clutch actuator of claim 1, wherein the stroke return unit comprises:
   a first guide rotatably coupled to the stroke controller;
   a second guide slidably coupled to the first guide, and hinge-coupled to the housing; and
   a return spring having one end coupled to the first guide and the other end coupled to the second guide, and elastically supporting the first and second guides.

4. The dual clutch actuator of claim 1, wherein the power generation unit, the stroke controller and the stroke return unit are provided in pairs and are arranged in parallel in the housing.

5. The dual clutch actuator of claim 4, further comprising a thrust bearing disposed between the pair of stroke controllers so as to prevent friction between the stroke controllers.

* * * * *